United States Patent [19]

Tyler

[11] Patent Number: 5,207,336
[45] Date of Patent: May 4, 1993

[54] SUPPORT BAR FOR STORAGE RACK

[75] Inventor: Thomas C. Tyler, Hopkins, Minn.

[73] Assignee: Core Technologies, Inc., Minneapolis, Minn.

[21] Appl. No.: 886,430

[22] Filed: May 20, 1992

[51] Int. Cl.⁵ .............................................. A47F 5/00
[52] U.S. Cl. ..................................... 211/183; 211/41; 211/162; 211/189
[58] Field of Search ................. 211/126, 41, 162, 183, 211/189

[56] References Cited

U.S. PATENT DOCUMENTS

| | | |
|---|---|---|
| D. 299,577 | 1/1989 | Price et al. . |
| D. 300,072 | 2/1989 | Price et al. . |
| D. 300,287 | 3/1989 | Price et al. . |
| D. 300,288 | 3/1989 | Price et al. . |
| 3,371,627 | 3/1968 | Belew . |
| 3,623,615 | 11/1971 | Kawachi . |
| 4,135,837 | 1/1979 | Suttles . |
| 4,579,231 | 4/1986 | Price . |
| 4,600,107 | 7/1986 | Price et al. . |
| 4,688,682 | 8/1987 | Price et al. . |
| 4,688,860 | 8/1987 | Accumanno et al. . |
| 4,709,815 | 12/1987 | Price et al. . |
| 4,715,669 | 12/1987 | Baillie et al. . |
| 4,782,958 | 11/1988 | Price et al. . |
| 4,815,795 | 3/1989 | Accumanno et al. . |

OTHER PUBLICATIONS

TAB Products Co., "TAB ® Magnetic Media Storage Systems," Jun. 1987.
U.S. Ser. No. 07/310,194, Feb. 14, 1989, P. D. Catalano.

Primary Examiner—Robert W. Gibson, Jr.
Attorney, Agent, or Firm—Merchant, Gould, Smith, Edell, Welter & Schmidt

[57] ABSTRACT

A support bar for a storage rack includes a first downwardly facing u-shaped channel forming two sidewalls each having a lower edge at the open side of the channel. A second upwardly facing u-shaped channel faces the opposite direction of the first channel, and is formed as an extension of the lower edge of one of the sidewalls so that the two channels form an s-shape. A low friction material is disposed in the second channel, the material having a channel formed therein. A flange is formed as an extension of the lower edge of the other of the sidewalls, the flange extending upwardly away from the lower edge. The flange provides an edge to hang tape reels from, and the multipacks can be mounted in the rack by placing a first one of their flanges in the channel formed in low friction material, with the other flange resting inside the downwardly facing channel with the multipack in a tipped-back position, the channel of the low friction material allowing the multipacks to be slid freely back and forth along the length of the bars.

1 Claim, 9 Drawing Sheets

SUPPORT BAR FOR STORAGE RACK

BACKGROUND OF THE INVENTION

1. Field of the Invention

The invention relates to a bar used within a storage rack to support multiple types of information storage media or materials such as computer or micrographics tapes and cartridges stored in a high density rack or modular storage system.

2. Description of the Prior Art

It is necessary to store large quantities of magnetic computer media and micrographics of all kinds in such a way that the stored items can be quickly retrieved. It is also necessary to provide a means to secure more than one type of media as many types are in common use today.

Previous designs for support bars used to secure media in high density storage racks or modular storage systems have been designed and manufactured for one particular type of item that was being stored within the rack or system. While different embodiments of particular bar designs existed in the prior art, no previous design incorporated the necessary features that would allow the use of one bar to store items efficiently that are of very different types such as relatively large, round computer reels and rather small, rectangular computer or micrographics cartridges.

When it became necessary in the prior art for a new or different material to be stored, an existing embodiment of the support bar either had to be adapted to a purpose for which it was not originally designed and suited, or else the original bar had to be discarded and replaced with another bar of a different design suited to hold the different material. If a bar was adapted somehow to a use for which it was never intended, such as the adoption of computer tape reel bars to accommodate multi-packs containing a plurality of substantially identical cartridges, the additional expense of the adoption plus the loss of storage efficiency caused by the adoption itself was significant. The alternative situation in which the original bar was discarded and replaced by another design embodiment that would accommodate new materials efficiently was financially significant and wasteful. In the case of one particular embodiment of the prior art, employed in the storage of multi-packs of computer or micrographics cartridges, the bar design called for a relatively expensive and difficult to manufacture assembly rather than a simple, single piece bar and insert design.

SUMMARY AND PURPOSE OF THE INVENTION

The subject invention is intended to remedy the above mentioned drawbacks. In particular, one purpose of the invention is to reduce the number of embodiments of the prior art that have been required simply because the prior art did not accommodate the storage of a multitude of substantially different items with the same bar.

Another purpose of the invention is to simplify the design of the bar by being of relatively simple one-piece construction, being relatively inexpensive to manufacture and being extremely reliable.

Another purpose of the invention is to avoid loss of any rack storage or operational efficiency caused by adaptations to the prior art.

Another purpose of the invention is to reduce the bar's coefficient of drag when it is used in conjunction with multi-packs that may slide laterally within a channel on the bar installed in a rack or storage system.

Another purpose of the invention is to provide a means for using this same bar for the storage of different materials, such as increasingly smaller information storage media being developed, both now and in the future, simply by changing a glide insert to the bar channel or by changing the multi-packs used to hold a plurality of substantially identical items being stored.

BRIEF DESCRIPTION OF THE DRAWINGS

One embodiment of the invention, which is defined in the attached claims, is described in more detail below with reference to the attached drawings, of which:

DESCRIPTION OF THE PREFERRED EMBODIMENTS

Figure 1:
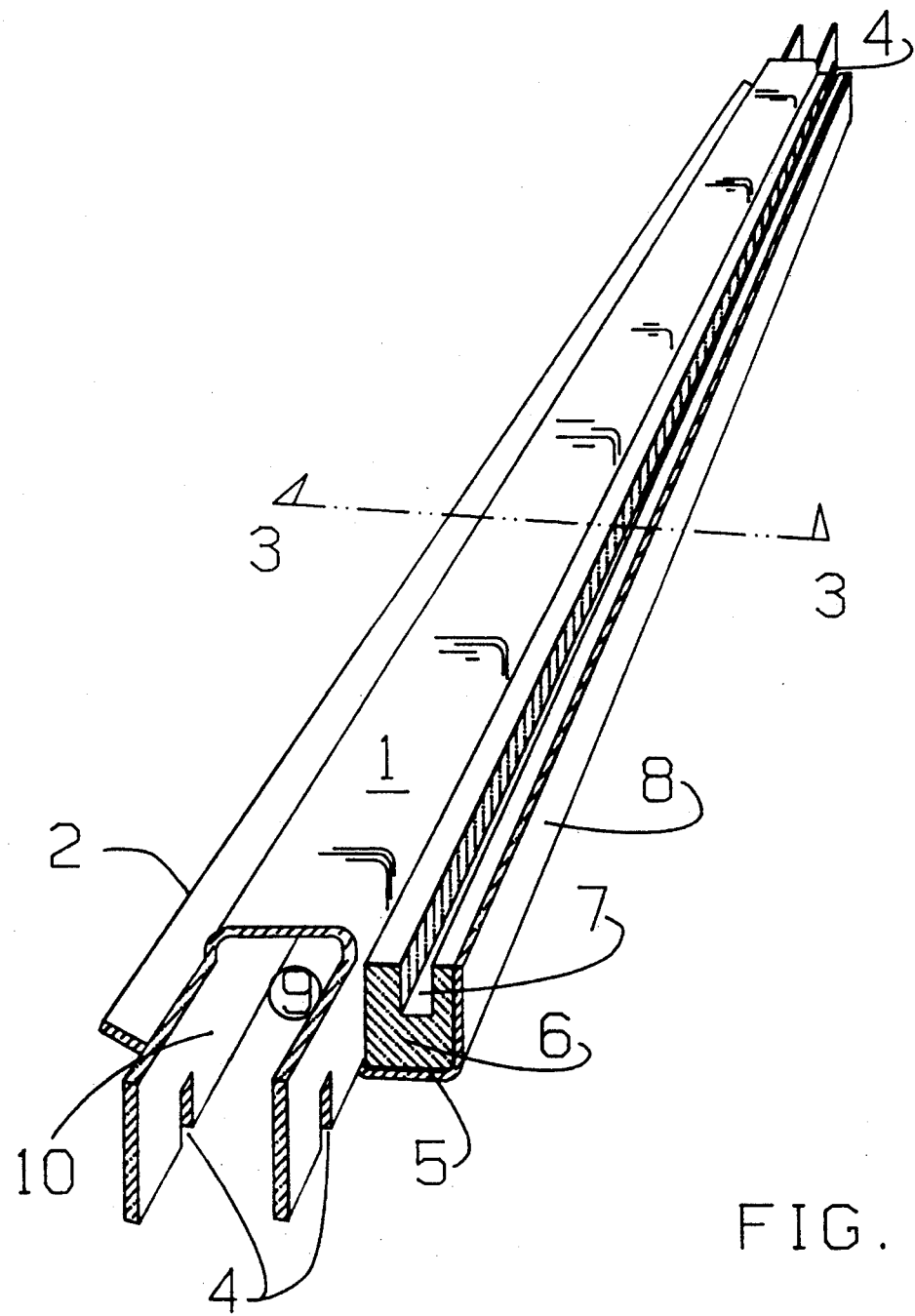
FIG. 1 is a perspective view of the bar of the present invention.

FIG. 1 is a perspective view of the bar body, according to the present invention. It consists of a steel bar 1 of unitary construction, having a surface 2 designed to support the hanging of items from it, an upward facing channel 5, designed to support items from below and that is formed between parallel surface 8 and the wall of the downward facing channel 9. Both ends of the bar body 1 have projections containing slots or notches 4 that engage appropriately with support points of a rack or modular storage system. Bar 1 can also be formed from other metals or high strength engineered plastics. A glide 6 is disposed in channel 5. Glide 6 has a channel 7, and is formed of a material that has a low coefficient of friction.

The invention is normally mounted with it's longitudinal axis oriented horizontally in a storage rack or system. Multiple bars are spaced equidistantly vertically and parallel to each other, as well as parallel to the vertical face of the rack FIGS. 13 and 14 or modular storage system FIGS. 11 and 12, by means of slots 4, or other suitable bar end designs, engaged securely with the sides of the rack. The other frame components of the storage rack or system are preferably made of steel, or other metal or high strength engineered plastics.

Figure 5:
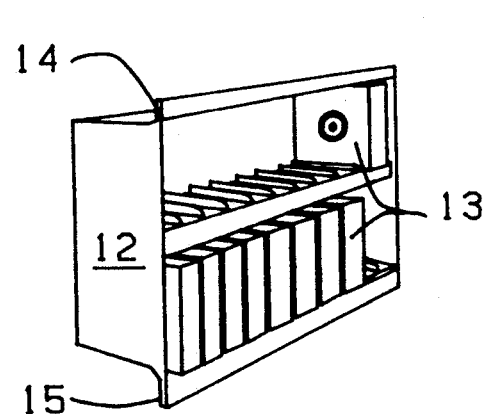
FIG. 5 is a perspective view of a typical multi-pack.
Figure 7:
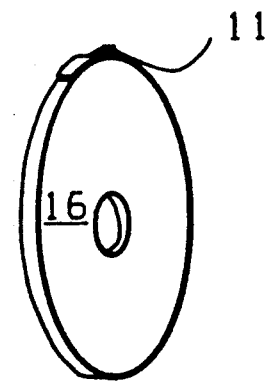
FIG. 7 is a perspective view of a computer tape reel with attached seal.

The invention is specially adapted to support the storage of a plurality of items of a first type, such as tape reel 16 of FIG. 7, a plurality of items of a second type, such as multi-pack 12 of FIG. 5, or a mixture of items of the first and second type. It is also specially suitable to support the storage of a plurality of items of other types, such as may be accommodated, for example, by different embodiments of the multi-pack.

Figure 2:
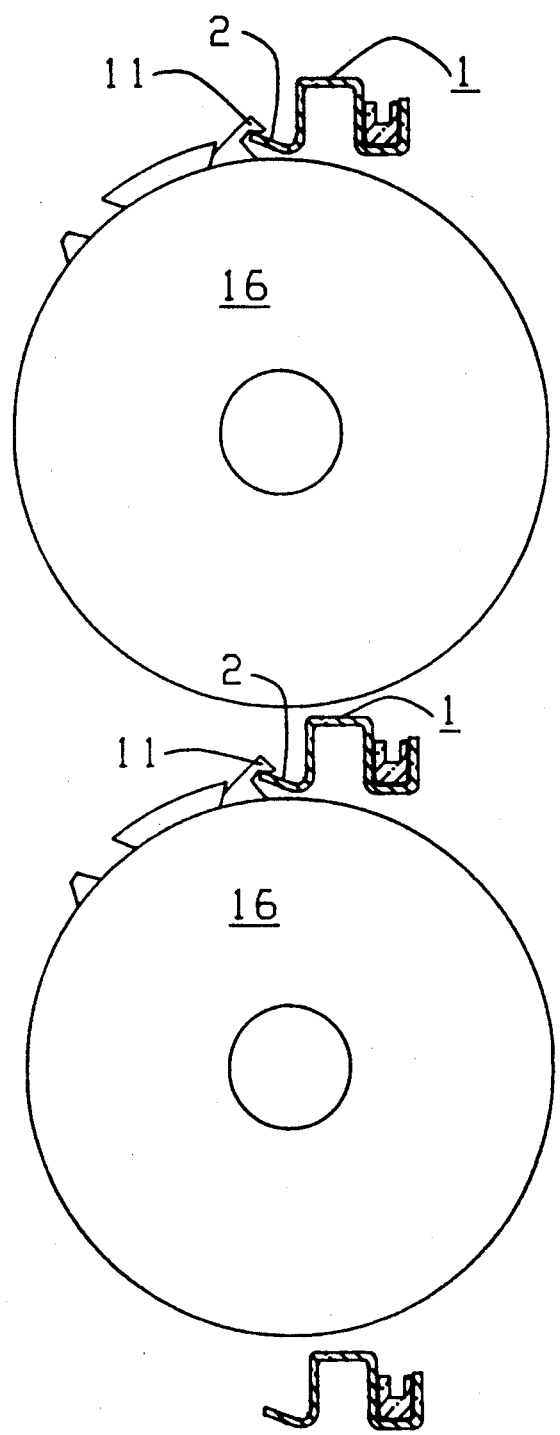
FIG. 2 illustrates common use of the bar with a cross-sectional view of two levels of computer tape reels.
Figure 12:
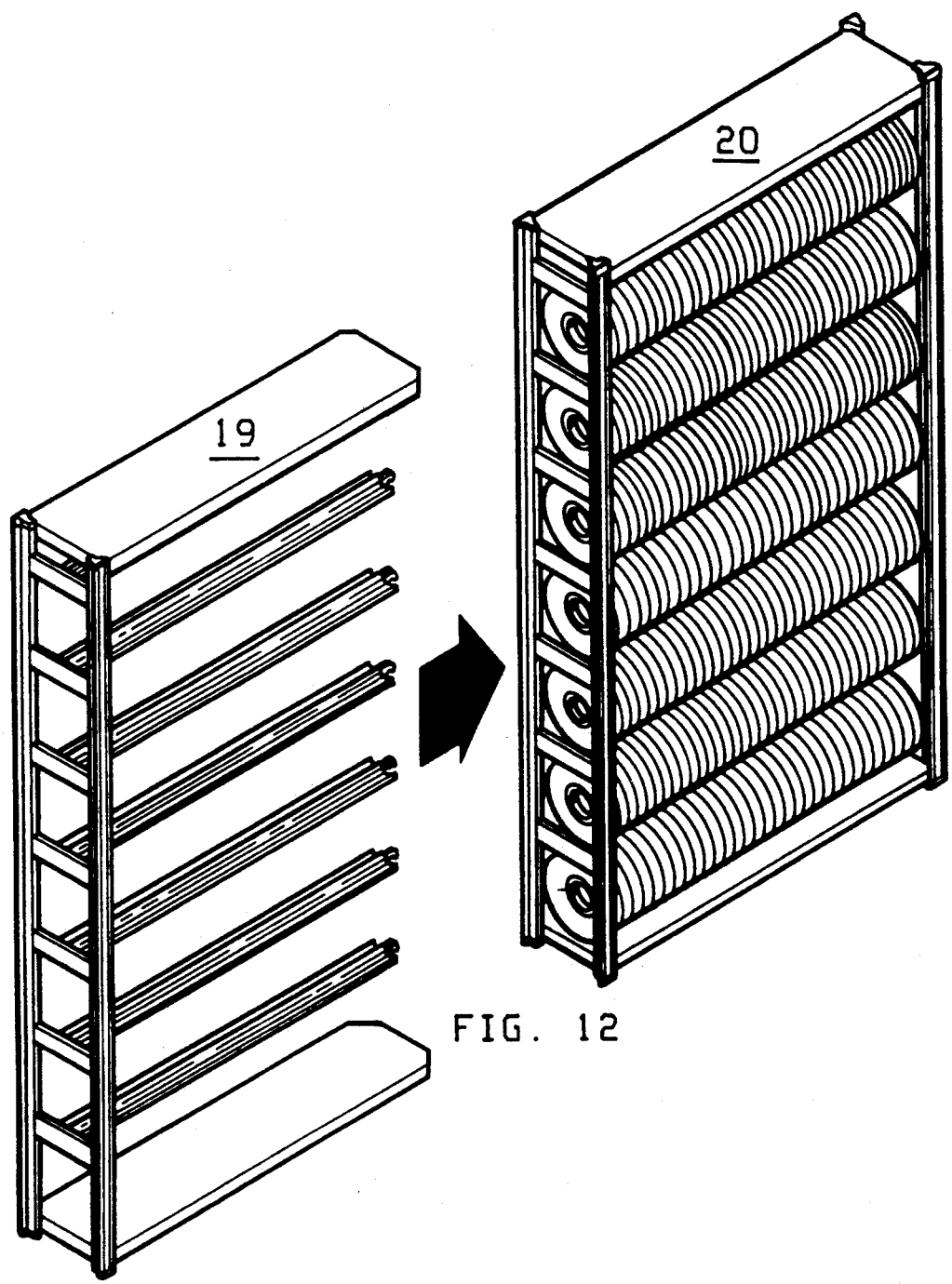
Figure 14:
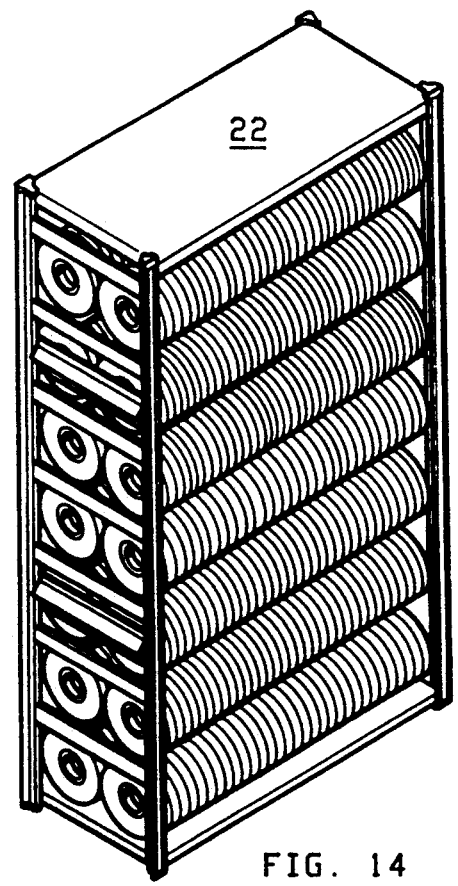

FIG. 2 illustrates in cross-sectional view the normal position of three bars 1 installed equidistantly vertically and parallel to each other, as well as parallel to the vertical face of a rack FIG. 14 or modular storage system FIG. 12. Hook 11 of a plurality of substantially identical items of a first type, computer tape reels 16 for example, is engaged over the top edge of surface 2 and the tape hangs in a stored position below bar 1. Rapid installation or removal of individual tapes 16 from bar 1 is accomplished with a slight rotation movement of the tape while simultaneously lowering or raising integral tape hook 11 onto or away from surface 2 respectively.

Figure 3:
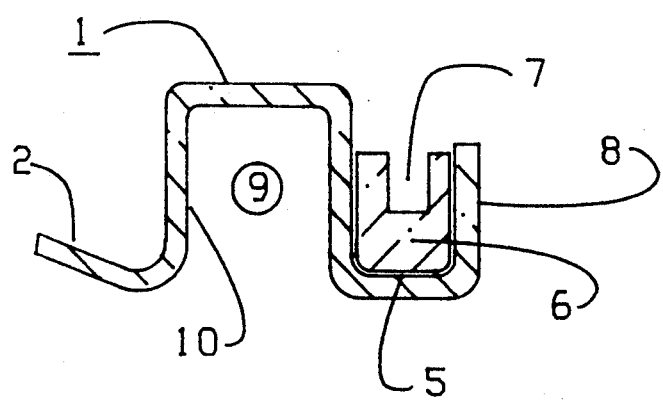
FIG. 3 is a cross-sectional view along axis 3—3 of FIG. 1.

FIG. 3 illustrates bar 1 cross-section 3—3 of FIG. 1. Surface 2 is formed as an integral portion of bar 1 and projects as an extension from the body of bar 1 along its continuous length and serves as a support hanger to engage hook 11 of a plurality of substantially identical tape reels 16. Upward facing channel 5 of the invention is also formed as an integral portion of bar 1 along its continuous length and serves as a receiver for glide 6 shown installed in channel 5. Channel 5 of bar 1, and to a limited extent glide 6, support the weight of a plurality of multi-packs 12 along the entire length of bar 1. Channel 7 of glide 6 is designed especially to both receive multi-packs 12 for use in a fixed position and to serve as a guide for extension 15 of a plurality of multi-packs 12 when they are moved laterally between two installed bars 1.

Figure 4:
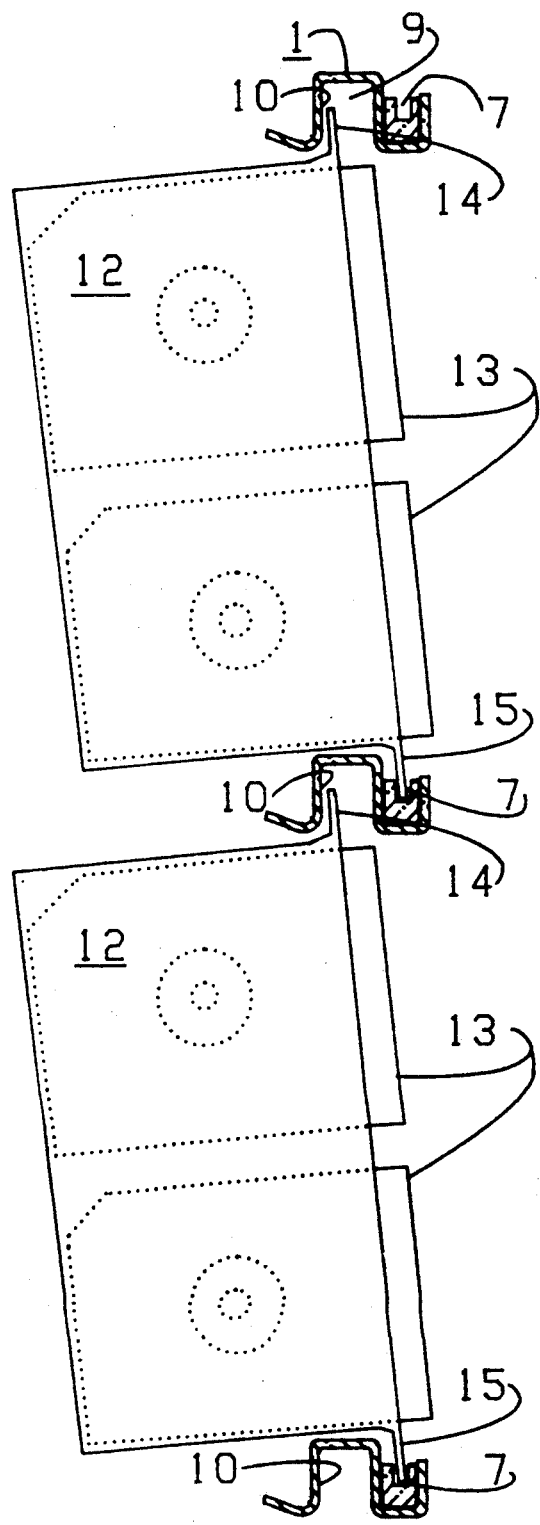
FIG. 4 illustrates common use of the bar with a cross-sectiontional view of two levels of multi-packs.
Figure 11:
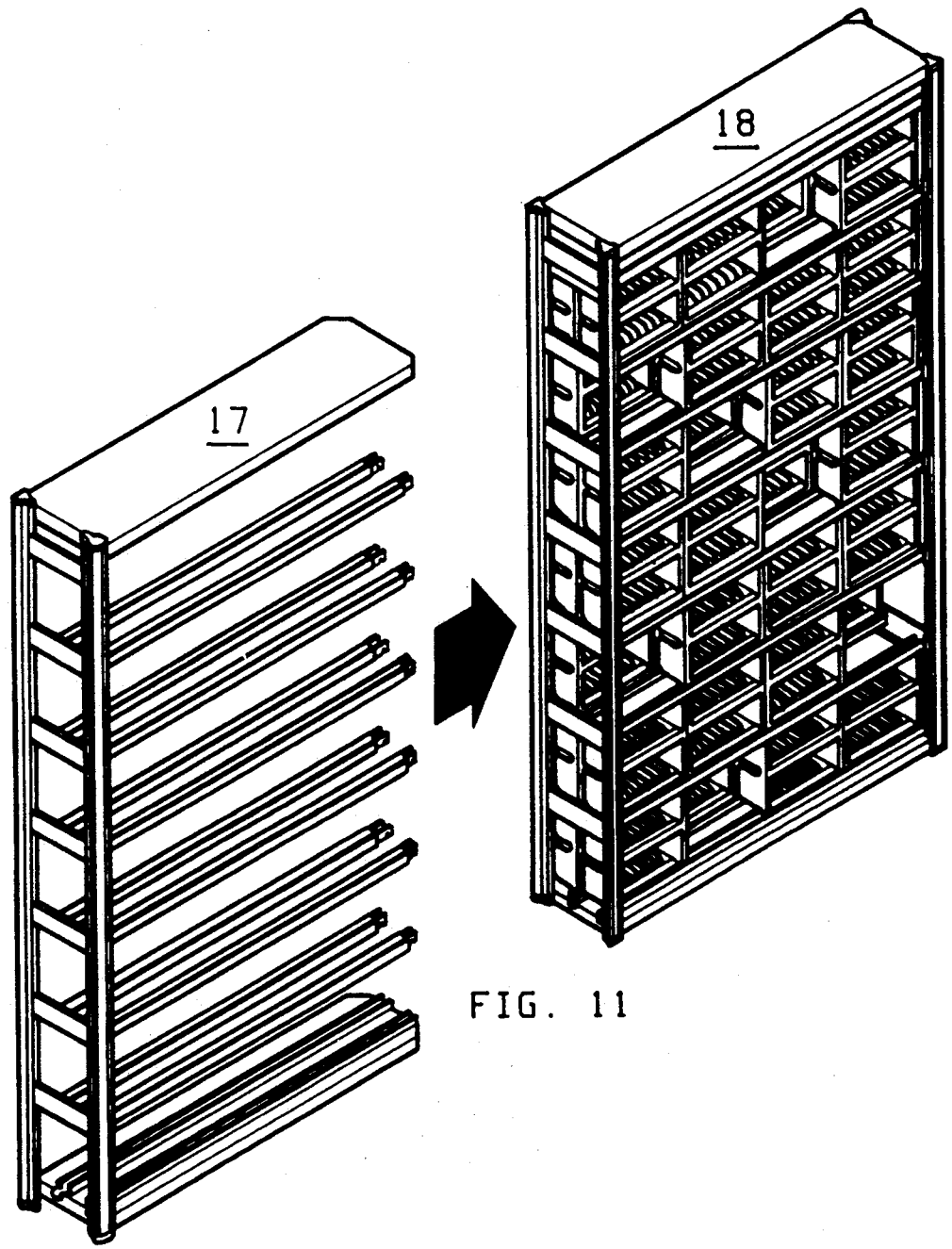
FIGS. 11 and 12 are perspective views of typical modular racks.
Figure 13:
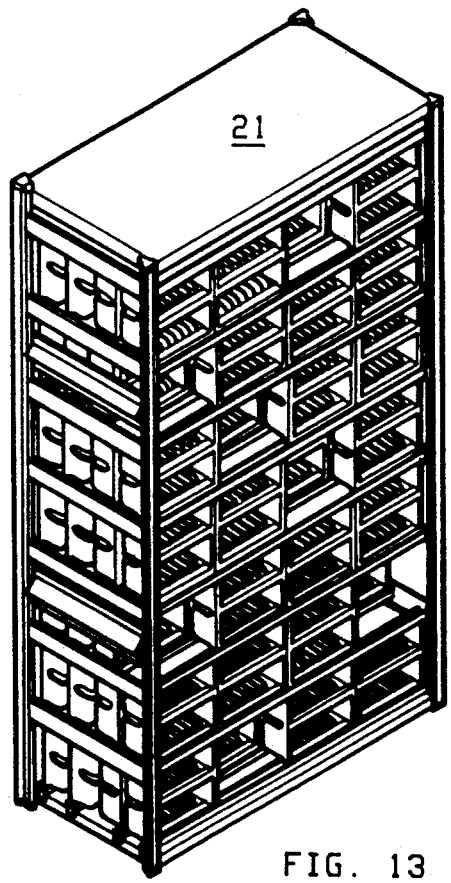
FIGS. 13 and 14 are perspective views of typical free standing racks.

FIG. 4 illustrates in cross-sectional view the normal position of three bars 1 installed equidistantly vertically and parallel to each other, as well as parallel to the vertical face of a rack FIG. 13 or modular storage system FIG. 11, mounted in a storage rack or system and the relative position of a plurality of multi-packs 12 holding a plurality of substantially identical computer or micrographics cartridges 13.

Downward facing channel 9 of bar 1 in conjunction with upward facing slot 7 of glide 6 also permits rapid installation or removal of individual multi-packs 12 from between vertically spaced parallel bars 1 as shown in FIG. 4.

Installation or removal of individual multi-packs 12 from between bars 1 is rapidly accomplished by lifting pack 12 upward with extension 14 riding surface 10 of the downward facing bar 1 slot 9 until extension 15 of the pack 12 clears the top of slot 7 and the top of surface 8. The bottom of the multi-pack 12 can then be swung outward and then downward in order to remove it from between two bars 1. The reverse procedure is used to install packs 12 between bars 1 until extension 15 of pack 12 is settled into channel 7 of guide 6.

For purposes of high storage density, more than one bar 1 may be installed horizontally in front of or behind another bar 1 and parallel to each other, as well as parallel to the vertical face of a rack 21 or modular storage system 18, and on each vertical level of a rack or storage system as illustrated further in FIGS. 11, 13, 6 and 9. When so installed, the front-most multi-packs 12 may move laterally between respective parallel bars 1 in each rack 18 and 21, in order to gain rapid access to cartridges 13 stored in a rearward position 24 of FIG. 6 and FIG. 9. Multi-packs 12 are retained by extension 15 resting in channel 7 of glide 6 and extension 14 projecting up into downward facing channel 9 while simultaneously resting lightly against surface 10. The weight of multi-packs 12 is borne mainly by glide 6 which is made of a material particularly suited to the lateral movement of projection 15 in channel 7 because the material of 6 has a relatively low coefficient of friction.

FIG. 5 is a perspective view of a typical multi-pack 12. The pack is designed to store a plurality of substantially identical items 13 of a relatively small size such as computer cartridges or micrographic cartridges. An upward projection 14 and a downward projection 15 serve to retain and guide 12 when installed between guide 6 channel 7 and bar 1 channel 9. Glide 6 is preferably manufactured out of ultra-high molecular weight polyethylene, teflon, or other such material. Nylon or Delrin may also be used.

Figure 6:
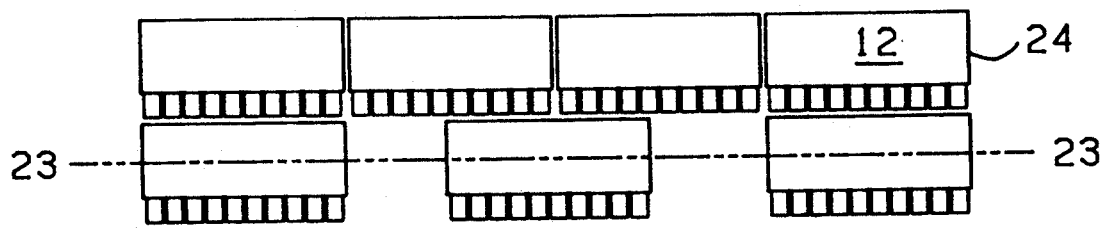
FIG. 6 shows how the multi-packs move laterally with a top view of packs installed in a single entry rack.

FIG. 6 is a top view of a single entry rack 18, designed to be accessed from a single side and typically installed against a wall. Frontward multi-packs 12 are permitted to slide laterally between pairs of equidistantly vertically spaced bars along line 23—23 in order to gain access to cartridges 13 located in multi-packs 12 that are in a rearward 24 position relative to the sliding multi-packs.

Although FIG. 6 illustrates an application whereby four multi-packs 12 are stored in a relatively rearward position 24 of a rack and three multi-packs 12 are stored in a front-most position along line 23—23, it is readily apparent that a different number of multi-packs could be stored at each relative position laterally along the length of the bars and that the bars could be either longer or shorter than illustrated. It is also readily apparent that more than two sets of parallel bars 1 could be mounted front to rear on each level of a storage rack 18 as is the case illustrated in FIG. 9 and FIG. 13.

FIG. 7 is both a front and side view of a computer tape reel 16 showing hook 11 from which the reel may be suspended.

Figure 8:
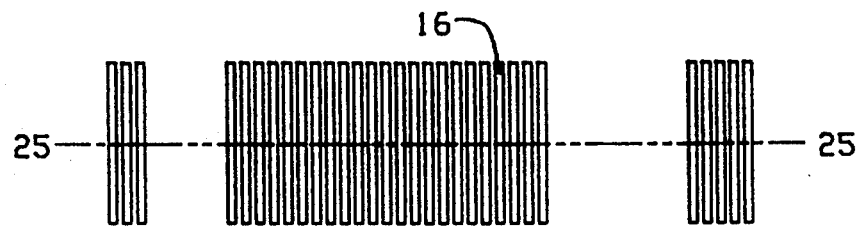
FIG. 8 shows how computer tape reels move laterally with a top view of reels installed in a single entry rack.

FIG. 8 illustrates from a top view how a number of reels 16 are arranged in a row along bar 1. It is possible to slide reels 16 by their hooks 11 along line 25—25 as bar 1 surface 2 is continuous rather than having individual hook 11 slots cut into the outermost edge of extension 2. This lateral sliding ability of reels 16 permits the very rapid library sequence filing and retrieval method, familiar to many tape librarians and record managers. This method is generally much faster than that of individual slot filing positions for tape reel 16 hooks 11. The continuous surface 2 of bar 1 also permits the filing or removal of more than one reel 16 at a time because several tape reels 16 may be grasped at once by a librarian without regard to individual slot separators present in much of the prior art and that would otherwise prevent such an action.

Figure 9:
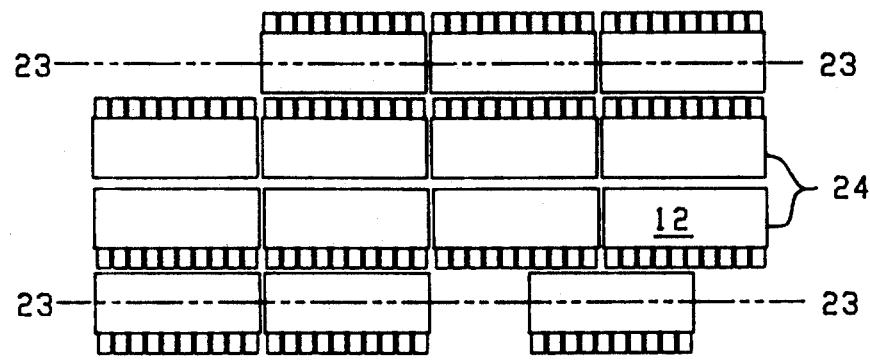
FIG. 9 is a top view of multi-packs installed in a double entry rack.

FIG. 9 is a top view of a double entry rack 13, designed to be accessed from both sides, where two rows of multi-packs 12 are located back to back in position 24 with respective front-most rows of multi-packs 12 able to slide laterally along line 23—23. A perspective view of a double entry multi-pack 12 rack is shown in FIG. 13.

Figure 10:
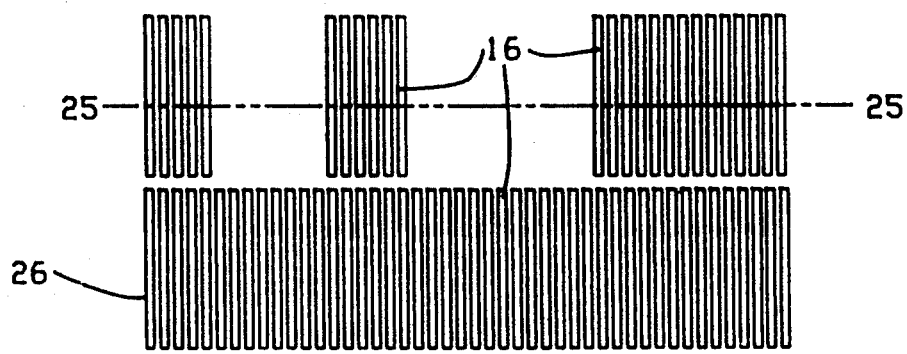
FIG. 10 is a top view of tape reels installed in a double entry rack.

FIG. 10 is a top view of a double entry rack 22 having one rack 22 side 26 filled completely with reels 16 and the other side partially filled, thus enabling lateral movement of reels 16 along line 25—25 similar to that described under FIG. 8. A perspective view of a double entry tape reel rack is shown in FIG. 14.

FIG. 11 is a perspective of two sections of single entry multi-pack 12 modular racks. Rack 18 is a row starter section and rack 17 is an add-on section. Two each bars 1 are installed per vertical rack level to provide a high density configuration of multi-packs 12 on each rack level and whose use is further illustrated by FIG. 6.

FIG. 12 is a perspective of two sections of single entry modular tape reel racks. Rack 20 is a row starter section and rack 19 is an add-on section. A single bar 1 is installed per vertical rack level to provide for the storage of tape reels 16 and whose use is further illustrated by FIG. 8.

It is contemplated that the preferred embodiments of the inventive concepts described and illustrated herein will readily occur to those skilled in the art. For example, the specific dimensions that work best for computer tape reels and computer cartridge multi-packs can be modified to accommodate other tape and cartridge sizes that may be developed in the future. Moreover, the material from which the bar is formed or from which the glide is molded or extruded may be varied. Accordingly, the examples set out above are merely exemplary and do not limit the scope of the invention, which is determined only by the appended claims.

What is claimed is:

1. A support bar of unitary construction for use in a rack storage system for storing either tape reels or multipacks containing a plurality of cartridges, the multipacks including first and second flanges on opposite sides of the open end thereof, wherein the bars are used in pairs and each supported parallel to the ground with one positioned above and in parallel with the other, the one being spaced apart from the other a predetermined distance generally corresponding to the diameter of a tape reel and the height of a multi-pack, comprising, as oriented in its operative position:

a first downwardly facing u-shaped channel forming two sidewalls each having a lower edge at the open side of the first channel;
    a second upwardly facing u-shaped channel facing the opposite direction of the first channel, and formed as an extension of the lower edge of one of the sidewalls so that the two channels form an s-shape;
    a low friction material disposed in the second channel, the material having a channel formed therein;
    a flange formed as an extension of the lower edge of the other of the sidewalls, the flange extending upwardly away from the lower edge; and
    whereby the flange provides an edge to hang tape reels from, and the multipacks can be mounted in the rack by placing a first one of their flanges in the channel formed in low friction material, with the other flange resting inside the downwardly facing channel with the multipack in a tipped-back position, the channel of the low friction material allowing the multipacks to be slid freely back and forth along the length of the bars.

* * * * *